United States Patent
Bakin et al.

(10) Patent No.: US 10,019,112 B2
(45) Date of Patent: Jul. 10, 2018

(54) TOUCH PANELS WITH DYNAMIC ZOOMING AND LOW PROFILE BEZELS

(71) Applicant: Semiconductor Components Industries, LLC, Phoenix, AZ (US)

(72) Inventors: Dmitry Bakin, San Jose, CA (US); Kenneth Edward Salsman, Pleasanton, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 516 days.

(21) Appl. No.: 13/627,920

(22) Filed: Sep. 26, 2012

(65) Prior Publication Data

US 2013/0100082 A1 Apr. 25, 2013

Related U.S. Application Data

(60) Provisional application No. 61/551,358, filed on Oct. 25, 2011.

(51) Int. Cl.
*G06F 3/042* (2006.01)

(52) U.S. Cl.
CPC .................. *G06F 3/042* (2013.01)

(58) Field of Classification Search
CPC .................. G09G 5/00; G06F 3/042
USPC .......................... 345/156–175; 245/156–175
See application file for complete search history.

(56) References Cited

U.S. PATENT DOCUMENTS

| | | | | |
|---|---|---|---|---|
| 4,507,557 A * | 3/1985 | Tsikos | .................. | G06F 3/0428 250/221 |
| 5,317,140 A * | 5/1994 | Dunthorn | .............. | G06F 3/0421 250/206.1 |
| 6,091,405 A * | 7/2000 | Lowe | ................... | G06F 3/0423 178/18.09 |
| 6,429,856 B1 * | 8/2002 | Omura | .................. | G06F 3/0416 178/18.09 |
| 6,642,936 B1 | 11/2003 | Engholm et al. | | |
| 7,119,800 B2 | 10/2006 | Kent et al. | | |
| 7,557,935 B2 * | 7/2009 | Baruch | ................. | G06F 3/0421 250/221 |
| 7,915,652 B2 * | 3/2011 | Lee | ................... | H01L 27/14609 257/291 |
| 8,023,051 B2 | 9/2011 | Tanabe et al. | | |
| 8,081,267 B2 | 12/2011 | Moscovitch et al. | | |
| 8,259,240 B2 * | 9/2012 | Han | ............................... | 349/12 |

(Continued)

*Primary Examiner* — Grant Sitta
(74) *Attorney, Agent, or Firm* — Treyz Law Group, P.C.; Vineet Dixit (57) ABSTRACT

An electronic device may have a touch panel. The touch panel may detect touch events using one or more cameras. The touch panel may include a planar exterior surface, such as a cover glass, that extends over an active region of a display and an inactive peripheral region. The cameras may be located underneath the inactive peripheral region. The cameras may include a light turning element to allow the cameras to detect touch events, without being raised above the exterior surface of the active region of the display (e.g., without having a raised profile). The touch panel may detect touch events using dynamic zooming techniques. As an example, the touch panel may divide the active region into sections, search for touch events in each section, zoom into sections in which touch events are found, and further search the sections in which touch events were found.

17 Claims, 7 Drawing Sheets

(56) References Cited

U.S. PATENT DOCUMENTS

| | | | | |
|---|---|---|---|---|
| 8,325,147 B2* | 12/2012 | Brand | G06F 3/044 | 345/173 |
| 8,344,311 B2* | 1/2013 | Tanaka | | 250/221 |
| 8,508,488 B2* | 8/2013 | Woo | H01J 11/12 | 345/173 |
| 8,581,874 B2* | 11/2013 | Brand | G06F 3/044 | 345/173 |
| 8,664,582 B2* | 3/2014 | McCarthy | G06F 3/042 | 250/221 |
| 2003/0156100 A1* | 8/2003 | Gettemy | G06F 3/0412 | 345/204 |
| 2004/0252091 A1* | 12/2004 | Ma | G06F 3/0421 | 345/87 |
| 2005/0162381 A1* | 7/2005 | Bell et al. | | 345/156 |
| 2005/0190162 A1* | 9/2005 | Newton | G06F 3/042 | 345/175 |
| 2006/0132460 A1 | 6/2006 | Kolmykov-Zotov et al. | | |
| 2008/0074401 A1* | 3/2008 | Chung | G02F 1/1368 | 345/175 |
| 2008/0111797 A1* | 5/2008 | Lee | G06F 3/0423 | 345/175 |
| 2008/0121442 A1* | 5/2008 | Boer | G06F 3/0412 | 178/18.09 |
| 2008/0158191 A1 | 7/2008 | Yang et al. | | |
| 2008/0259052 A1* | 10/2008 | Lin | G06F 3/0421 | 345/175 |
| 2009/0058832 A1* | 3/2009 | Newton | | 345/175 |
| 2009/0195517 A1* | 8/2009 | Duheille | G06F 3/043 | 345/177 |
| 2009/0278048 A1* | 11/2009 | Choe et al. | | 250/339.05 |
| 2009/0295760 A1* | 12/2009 | Linge | G06F 3/0412 | 345/179 |
| 2009/0321865 A1* | 12/2009 | Kasano et al. | | 257/432 |
| 2010/0117989 A1* | 5/2010 | Chang | G06F 3/0414 | 345/175 |
| 2010/0156805 A1* | 6/2010 | Brand et al. | | 345/173 |
| 2010/0271336 A1* | 10/2010 | Harada | G06F 3/0412 | 345/175 |
| 2010/0289885 A1* | 11/2010 | Lu et al. | | 348/61 |
| 2010/0315372 A1* | 12/2010 | Ng | G06F 3/0416 | 345/174 |
| 2011/0007032 A1* | 1/2011 | Goertz | | 345/174 |
| 2011/0109563 A1 | 5/2011 | Liu | | |
| 2011/0115747 A1* | 5/2011 | Powell | G06F 3/042 | 345/175 |
| 2011/0141064 A1* | 6/2011 | Suggs | G06F 3/0418 | 345/175 |
| 2011/0187679 A1* | 8/2011 | Ko | G06F 3/042 | 345/175 |
| 2012/0007804 A1* | 1/2012 | Morrison | G06F 3/005 | 345/158 |
| 2012/0105380 A1* | 5/2012 | Morrison | | 345/175 |
| 2012/0127128 A1* | 5/2012 | Large et al. | | 345/175 |
| 2012/0133618 A1* | 5/2012 | Usukura | G02F 1/13338 | 345/175 |

* cited by examiner

TOUCH PANELS WITH DYNAMIC ZOOMING AND LOW PROFILE BEZELS

This application claims the benefit of provisional patent application No. 61/551,358, filed Oct. 25, 2011, which is hereby incorporated by reference herein in its entirety.

BACKGROUND

The present invention relates to touch panels and, more particularly, to touch panels that may have dynamic zooming capabilities and that may have a low profile bezel.

Electronic devices such as cellular telephones, camera, and computers often use touch panels as user input devices. Various technologies have been employed for identifying the position of a user's touch on a touch panel. These technologies include optical imaging methods, in which image sensors located along edges of a touch panel detect the presence of a user's touch on the touch panel. The optical components required in implementing conventional optical imaging technologies in a touch panel protrude above the surface of the panel, necessitating an elevated bezel around the perimeter of the touch panel. As a result, conventional touch panels have undesirably elevated bezels. In addition, conventional optical imaging technologies are incapable of providing high positional accuracy (i.e., resolution) together with a fast refresh rate (e.g., imager frame rate), especially when the conventional optical imaging technologies are used in relatively larger (e.g., greater than 14 inch) touch panels.

DETAILED DESCRIPTION

Figure 1:
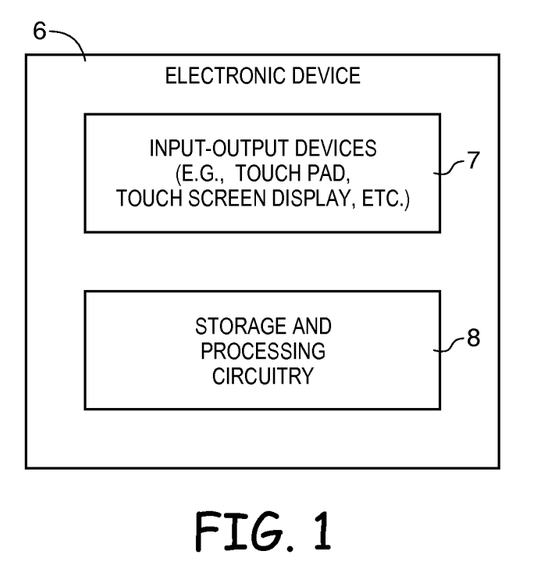
FIG. 1 is a diagram of an illustrative electronic device that may include a touch panel that may implement dynamic zooming techniques and that may have a low profile bezel in accordance with embodiments of the present invention.

Touch panels are widely used in electronic devices. An electronic device with a touch panel is shown in FIG. 1. Electronic device 6 may be any electronic device that includes an input-output device 7 such as a touch panel (e.g., a touch sensitive surface that may or may not have display capabilities). As examples, electronic device 6 may be a laptop having a display, a desktop computer with an integrated monitor, a standalone monitor, a display, a television, etc. If desired, the touch panel of electronic device 6 may have a planar surface.

Device 6 may include input-output devices 7 such as a touch pad, a touch screen display, a touch panel (e.g., a touch screen that may or may not have display functionality), a camera (e.g., an imager), etc. Input-output devices 7 may include devices such as projectors, keypads, and input-output ports. Touch panel 7 may sense touch events using optical technology (e.g., touch panel 7 may include one or more image sensors and associated lenses used in detecting touch events). Pixels in the image sensors include photosensitive elements that convert the light into digital data. Image sensors may have any number of pixels (e.g., hundreds, thousands, millions or more).

Device 6 may include storage and processing circuitry 8, some of which may be associated with touch panel 7. Storage and processing circuitry 8 may include display processing circuitry, touch panel processing circuitry, image processing circuitry, microprocessors, microcontrollers, digital signal processors, application specific integrated circuits, volatile and nonvolatile memory (e.g., random-access memory, flash memory, hard drives, solid state drives, etc.), and other circuitry. Still and video image data from camera sensors in touch panel 7 (e.g., camera sensors used in detecting touch events) may be provided to storage and processing circuitry 8. Image processing circuitry in storage and processing circuitry 8 may be used to perform processing functions such as detecting touch events, adjusting exposure, etc.

Electronic device 6 typically provides a user with numerous high level functions. In a touch panel display, for example, a user may be provide with displayed images and video and a user may be provided with the ability to provide user input via touch (and near-touch) inputs.

Figure 2:
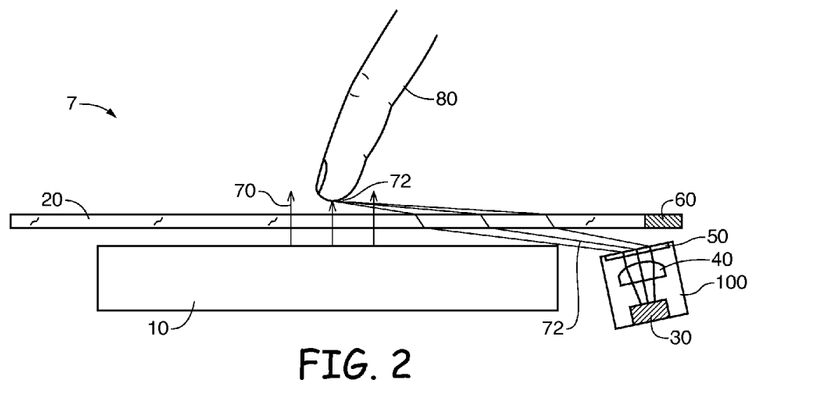
FIG. 2 is a cross-sectional view of an illustrative touch panel that may implement dynamic zooming techniques and that may have a low height bezel in accordance with embodiments of the present invention.

An illustrative touch panel 7 is shown in FIG. 2. As shown in FIG. 2, touch panel 7 may include display module 10. Display 10 may be implemented using any desired display technology. As examples, display 10 may be a liquid crystal display, a light emitting diode display, an organic light emitting diode display, a plasma display, a projection (front or rear) display, an e-ink display, etc. If desired, display 10 may be replaced with a printed image or an opaque backing (e.g., when touch panel 7 is used as a touch pad without active display functionality).

If desired, touch panel 7 may include cover member 20 over display 10. Cover member 20 may, as examples, be formed from glass, plastic, or other suitably transparent materials. Cover member 20 may sometimes be referred to herein as cover glass 20.

With some suitable arrangements, touch panel 7 may include light blocking material 60 in the peripheral regions of cover glass 20. Light blocking material 60 may be, as examples, a layer of opaque material formed above, within, or below cover glass 20. Light blocking material 60 may improve the aesthetics of touch panel 7 by blocking unsightly components underlying cover glass 20 from the view of users of touch panel 7. As an example, light blocking material 60 may partially or completely hide one or more cameras 100 and associated components from the view of users of touch panel 7. While FIG. 2 illustrates light blocking material 60 covering approximately half of a camera 100 and its associated components, this is merely an example. If desired, light blocking material 60 may be extended as far as the active region of display 10 (thereby further obscuring cameras 100 from view).

As shown in FIG. 2, touch panel 7 may include one or more cameras 100. Cameras 100 may be sensitive to visible light or, in at least some embodiments, sensitive to infrared light. Cameras 100 may be located along the periphery of touch panel 7 (e.g., adjacent to display 10) and may be used in detecting images of an object 80 such as a user's finger. In some suitable arrangements, object 80 may be illuminated by light 70 (e.g., infrared light 70) from display panel 10.

Each camera 100 may include an image sensor array 30, one or more lenses 40, and a turning element 50. Each camera 100 may capture images of objection 80 using light rays 72 (e.g., scattered infrared light rays 72). Light rays 72 may pass through cover glass 20 towards turning element 50 (sometimes referred to herein as turning plate 50). Light rays 72 may be redirected, by turning plate 50, towards imaging lens 40. Imaging lens 40 may focus light rays 72 and thereby form an image on image sensor 30. Light blocking mask 60 may serve to prevent unwanted light rays (e.g., light rays from objects not above the touch sensitive surface of touch panel 7 such as objects outside the periphery of display 10) from reaching cameras 100.

By including light turning element 50 in touch cameras 100, touch panel 7 may have a low height bezel (e.g., a low or zero profile bezel). With one suitable arrangement, the bezel of touch panel 7 (e.g., the peripheral regions of cover glass 20, such as the regions that include light blocking material 60) may be flush with the central (e.g., active) region of touch panel 7. In other words, touch panel 7 may have a zero height bezel that does not protrude above the plane of the active region of touch panel 7.

Figure 3:
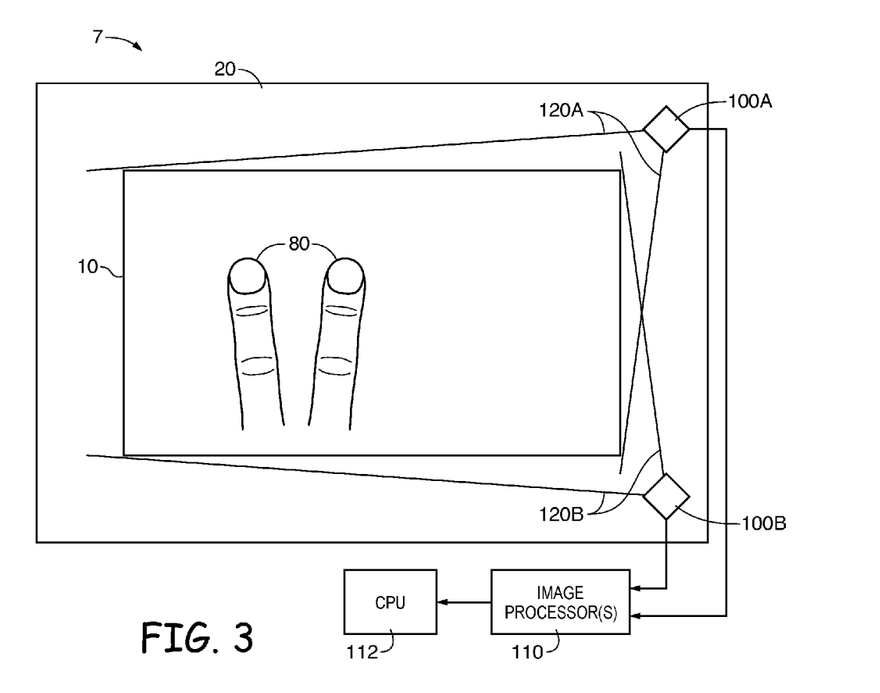
FIG. 3 is a top view of the touch panel of FIG. 2 showing how two or more cameras may be used to detect touch events in accordance with embodiments of the present invention.

A top view of touch panel 7 of FIG. 2 is shown in FIG. 3. As shown in FIG. 3, touch panel 7 may include multiple touch cameras 100. In the example of FIG. 3, touch panel 7 includes two touch cameras 100A and 100B. In general, touch panel 7 may include more than two touch cameras 100. As examples, touch panel 7 may include a touch camera at two, three, or all four corners of display 10 and touch panel 7 may include any number of touch cameras along one, two, three, or all four peripheral edges of display 10. Touch panel 7 may include at least two touch cameras 100 in order to provide multi-touch capabilities (e.g., in order to simultaneously detect multiple touch events).

If desired, each camera 100 may have a horizontal field of view (e.g., a field of view parallel to the surface of touch panel 7) sufficient to detect touch events on the entire active surface of touch panel 7 (e.g., over the active surface of display 10). Field of view 120A may correspond to touch camera 100A, while field of view 120B may correspond to touch camera 100B. The fields of view 120A and 120B of touch cameras 100A and 100B may each be approximately 90 degrees.

The outputs of touch cameras 100 may be provided to image processor 110 (e.g., an image processor in circuitry 8 of FIG. 1). Image processor 110 may utilize image data from touch cameras 100 to identify (e.g., extract) the positions of one or more objects 80 that are touching, or nearly touching, touch panel 7. Image processor 110 may provide outputs to processor 112 (e.g., a CPU or other processor in circuitry 8 of FIG. 1) that indicate one or more locations that one or more objects 80 are touching, or nearly touching, on touch panel 7.

Figure 4:
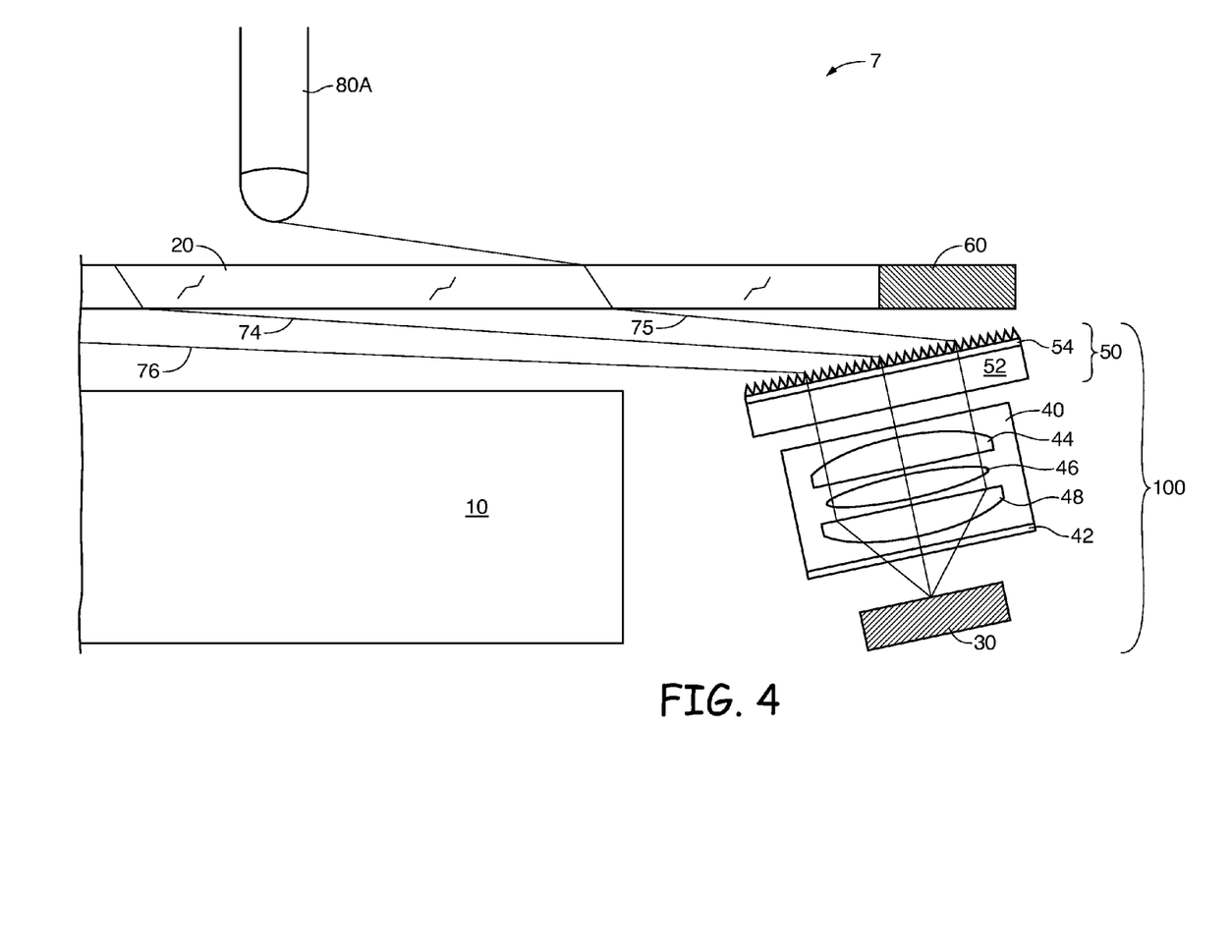
FIG. 4 is a cross-sectional view of an illustrative camera system that may include a turning element in accordance with embodiments of the present invention.

An example of a touch camera 100 that may be used in providing touch panel 7 with optical touch sensing capabilities is shown in FIG. 4. As shown in FIG. 4, touch camera 100 may be tilted with respect to cover glass 20 and display 10 and turning element 50 may include turning film 54 and optional support structure 52.

FIG. 4 illustrates three light rays 74, 75, and 76 respectively representing the center and the boundaries of camera 100's field of view. In other words, light ray 75 may illustrate the path of light rays scattered from objects 80A touching (or nearly touching) touch panel 7 at points on cover glass 20 closest to touch camera 100. Further, light ray 74 may illustrate the path of light rays scattered from objects 80B (not shown) touching (or nearly touching) touch panel 7 at points in the center of cover glass 20 while light ray 76 may illustrate the path of light rays scattered from objects 80C (not shown) touching (or nearly touching) touch panel 7 at points on cover glass 20 farthest from touch camera 100. With one suitable arrangement, light ray 74 may have an angle of approximately 71 degrees to the normal of the surface of turning film 54.

Turning film 54 may, if desired, be attached to a structural support structure such as glass plate 52. The side of turning film 54 opposite glass plate 52 may, if desired, have a lenticular prism array. The lenticular prism array may be formed from extruded plastic, as an example. The side of turning film 54 facing glass plate 54 may have a flat surface (attached to plate 54). Any desired turning film may be used for film 54. As an example, the commercially available right angle film Vikuiti™, produced by the 3M Corporation of St. Paul, Minn. may be used.

Turning film 54 may have a symmetrically shaped prism structure with a pitch (point-to-point separate) of 50 microns; may be made out of modified acrylic resin applied to a polyester substrate; may have a nominal thickness of 155 microns; may have accept light rays within approximately 20 degrees of approximately 71 degrees (from both sides) from the normal of film 54 (e.g., may accept light from both sides in the window of approximately 90 degrees to approximately 51 degrees from the normal of the surface of substrate 52); may output rays within an output range of approximately 0 to 20 degrees from the normal of film 54. The resent of light blocking material 60 may prevent unwanted light rays (e.g., light rays coming from the opposite direction as rays 74, 75, and 76) from entering camera 100.

The use of light turning film 54 can, in some arrangements, present chromatic aberrations that present imaging difficulties. In particular, light passing through turning film 54 may be separated into its constituent wavelengths (e.g., light rays along a particular path, such as the path of rays 75, may be turned by a different amount depending on their color). These effects may be diminished or eliminated by including one or more filters in camera 100. As an example, camera 100 may include one or more filters 42 on the back of imaging lens 40. Filter 42 may, if desired, be located in other locations such as on the front of lens 40, as part of turning element 50, on the front or rear surfaces of substrate 54, or in any other desired location. With some suitable arrangements, filter 42 may be an infrared band filter (e.g., a filter that blocks light at frequencies above or below desired infrared frequencies). If desired, display 10 may emit infrared light at frequencies passed by filter 42 (e.g., display 10 may include one or more narrow-band infrared light sources). As one example, filter 43 may transmit light only between 800 and 900 nanometers. Since only a narrow set of wavelengths is allowed to reach light sensor 30, the chromatic aberration effect produced by light turning film 54 is minimized or eliminated.

As shown in FIG. 4, imaging lens 40 of each camera 100 may include one or more optical elements, such as optical elements 44, 46, and 48. Lens 40 may, as examples, have a f-stop of approximately f/2.0, a focal length of approximately 0.7 mm, and a horizontal field of view of more than 90 degrees.

Lens 40 may focus light rays (e.g., project rays 74, 75, and 76) onto an imaging sensor such as sensor 30. Lens 40 may have a sufficiently large aperture and sensor 30 may be sufficiently sensitive such that camera 100 is capable of achieving frame rates on the order of 200 frames per second (the IR illumination provided by display 10 may also effect the frame rate of camera 100). Image sensor 30 may be a CMOS imaging sensor such as Aptina Imaging Corporation's MI-0380 CMOS imaging sensor. Image sensor 30 may have a maximum (i.e., native) VGA resolution of 640 by 480 pixels and the individual pixels of image sensor 30 may be approximately 2.2 microns in size, as examples.

As described above, display panel 10 may emit light that scatters of objects 80 that are touching, or nearly touching, cover glass 20 (and the light may be received by cameras 100, which detect touch events). In at least some arrangement, display panel 10 may emit light in wavelengths outside the visible spectrum, such as infrared light, which may illuminate objects 80 for cameras 100. By providing light in wavelengths outside the visible spectrum, display 10 is able to provide a constant level of brightness in the light wavelengths used by cameras 100 for detecting touch events (e.g., the light level in the wavelengths used by cameras 100 may be independent of the visible image displayed on display 10).

Figure 5:
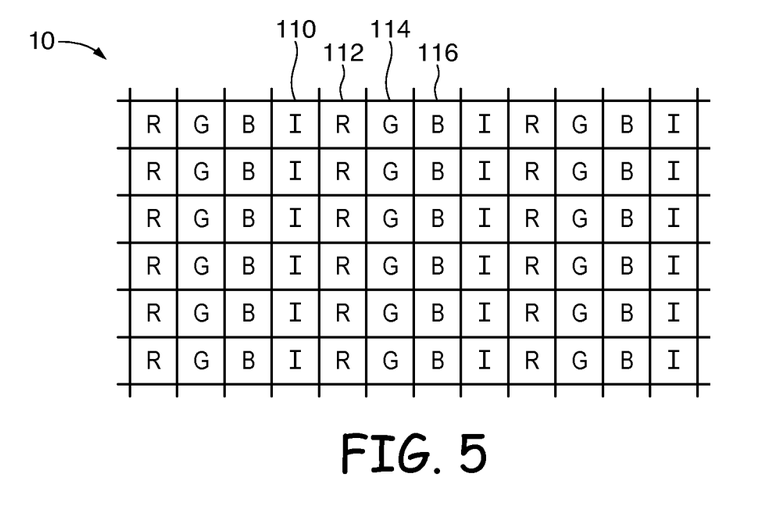
FIG. 5 is a top view of illustrative pixels in a touch panel such as the touch panel of FIG. 2 in accordance with embodiments of the present invention.

An example of a display 10 based on LCD technology is shown in FIG. 5. As shown in FIG. 5, display 10 may include an array of infrared pixels 110, red pixels 112, green pixels 114, and blue pixels 116. FIG. 5 shows equal numbers of infrared, red, green, and blue pixels in the array of display 10 as an illustrative example. If desired, display 10 may have more or fewer infrared pixels 110 that red, green, and pixels. If desired, other types of display technologies may be used in implementing display 10 such as plasma, OLED, e-ink, etc. When display 10 is implemented using such technologies, infrared light sources such as infrared pixels 110 may be added to the base technologies.

Display 10 may include a broadband illuminating light source (not shown) behind the pixels of FIG. 5. Red pixels 112, green pixels 114, and blue pixels 116 may include red, green, and blue filters respectively and may serve to block or pass color light in response to electrical signals applied to each pixel. Infrared pixels 100 may have a structure similar to the red, green, and blue pixels, except that infrared pixels 100 include an infrared filter that blocks visible light and passes infrared light. Infrared pixels 100 may be permanently active (e.g., may permanently pass infrared light and may even omit the liquid crystal structures) or may be capable of being turned on, off, and even dimmed. Infrared pixels 100 may be individually controllable or may be controllable in groups, as examples.

If desired, cameras 100 may be configured to detect light in one or more visible wavelengths, rather than in infrared wavelengths. In such arrangements, infrared pixels 110 could be omitted from display 10. While cameras 100 would face lighting levels that varied with the image display by display 10, such arrangements could still be implemented.

Figure 6:
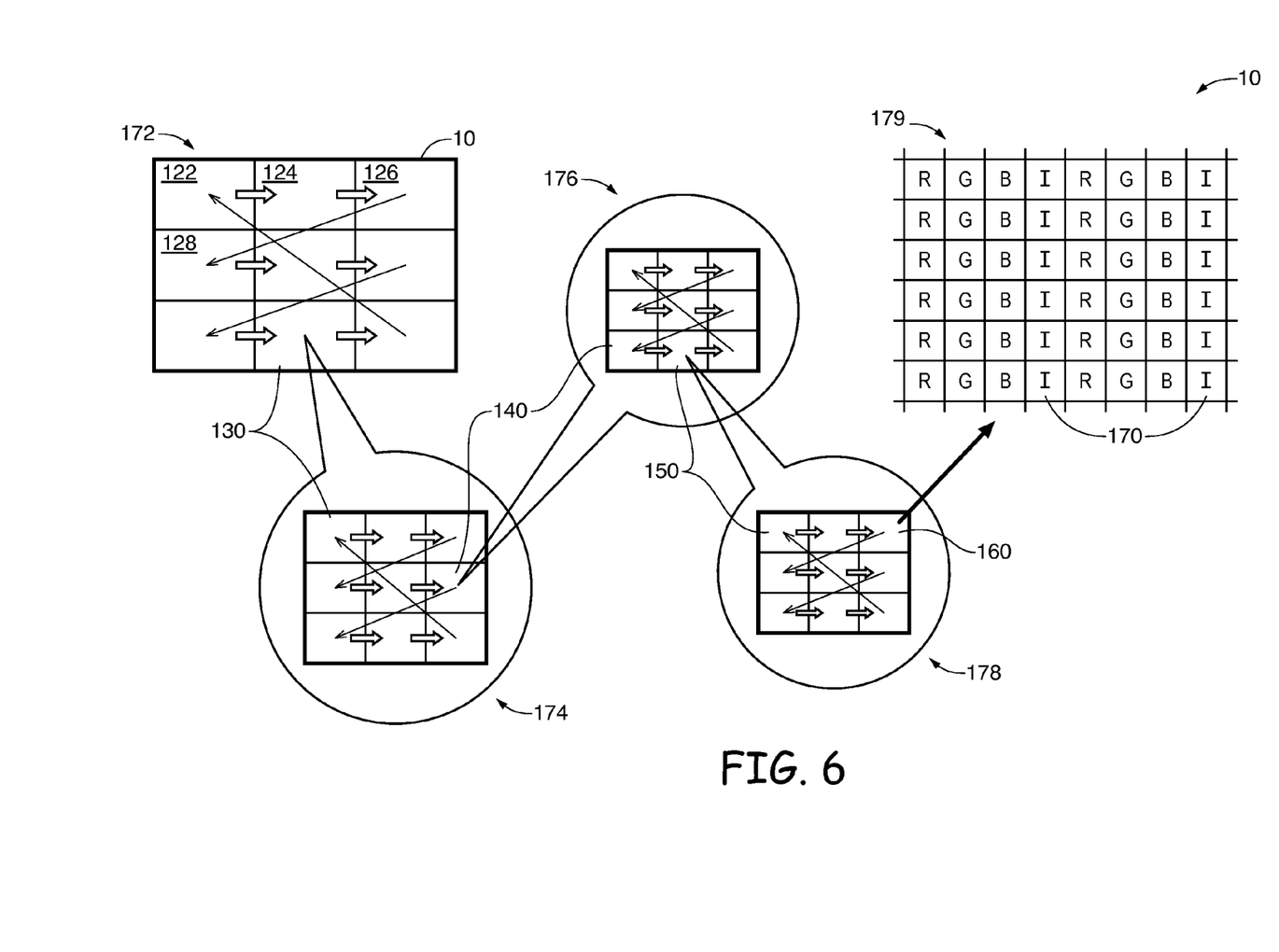
FIG. 6 shows illustrative top views of nested regions of a touch panel that may implement dynamic zooming in accordance with embodiments of the present invention.

With some suitable arrangements, touch panel 7 may implement dynamic zooming techniques. Illustrative dynamic zooming techniques are illustrated in FIG. 6. In dynamic zooming arrangements, the surface of touch panel 7 (e.g., the surface of display 10) may be divided into a plurality of nested sections. There may be any desired number of nested levels. In the example of FIG. 6, there are five different levels nested together. Each level may be broken into any desired number of sections, each of which may be further broken down into any desired number of sub-sections, and so on until the level of individual pixels is reached. As shown view 172, the surface of touch panel 7 may be broken into nine sections (3×3 sections). As shown in view 174, each of the sections of touch panel 7 may be broken into nine subsections (3×3 subsections). As shown in view 176, each of the subsections of touch panel 7 may be broken into nine sub-subsections (3×3 sub-subsections). As shown in view 178, each of the sub-subsections of touch panel 7 may be broken into nine sub-sub-subsections (3×3 sub-sub-subsections). As shown in view 179, each of the sub-sub-subsections of touch panel 7 may be formed from a group of individual pixels.

When implementing a dynamic zooming technique, touch panel 7 may detect touch events (e.g., touches and near-touches) using the following processes. As a first step, the IR pixels of a first section may be opened, illuminating any objections 80 that are touching, or nearly touching display 10 above that section. For clarify, the first section is identified as section 122 of view 172. The infrared pixels in all of the other sections may be closed at this time. At subsequent steps the IR pixels of subsequent sections, such as sections 124, 126, 128, and 130 are sequentially opened one-by-one (such that only the IR pixels of a single section are open at a time). This process may continue until each of the sections of view 172 has had its IR pixels open (or may stop as soon as cameras 100 detect an object in one of the sections, if touch panel 7 is configured to support only single touch events).

As the preceding process progresses, cameras 100 may capture one or more images during the period in which each respective sections' IR pixels are illuminated (e.g., cameras 10 may capture at least one image while the IR pixels of section 122 are illuminated, at least one image while the IR pixels of section 124 are illuminated, etc.). If desired, the framerate of cameras 100 may be synchronized with the segmental illumination of the sections of display 10. With some suitable arrangements, the image sensing pixels of cameras 100 may be binned with an 8×8 binning, as an example, to reduce the resolution, but significantly increase sensitivity and minimize data sizes. If desired, the binning applied to sensors 30 may be reduced in subsequent rounds. Cameras 100 may be able to quickly determine whether an object is touching, or nearly touching, an illuminated section, but may not be able to (at this time) determine exactly where within the illuminated section the object is touching.

If cameras 100 detect an object touching, or nearly touching, one or more illuminated sections, the touch panel 7 may dynamically zoom into the illuminated sections (e.g., when one or more illuminated sections produces a stronger image signal during segmental IR illumination). As shown in the FIG. 6 example, when an object 80 is detected touching, or nearly touching, section 130, touch panel 7 may begin segmentally illuminating and scanning the sub-sections of section 130 for touch events.

Once cameras determine which of the sub-sections of section 130 provide the strongest image signals (e.g., which sub-sections most closely correspond to the location at which the object is touching, or nearly, display 10), the touch panel 7 may be further dynamically zoomed into those sub-sections. This process may repeat in any desired number of rounds, until the exact location of the object is determined. As shown in the FIG. 6 example, touch panel 7 may identify an object touching panel 7 in subsection 140 in the second round of touch sensing as shown in view 174, may identify an object in section 150 in the third round of touch sensing as shown in view 176, may identify an object in section 160 in the fourth round of touch sensing as shown in view 178, and, as shown in view 179, may determine that the object is closest to pixels 170.

In order to detect multiple simultaneous touch events (e.g., to provide multitouch capabilities), touch panel 7 may check each section at the current level (rather than proceeding to the next level upon detection of a strong signal). In addition, if touch panel 7 detects multiple sections at the current level with strong signals (e.g., image signals above a given threshold level for the current level), touch panel 7 may check the sub-sections of each of the multiple sections in the following round. With some suitable arrangements, touch panel 7 will redo the first round (e.g., check the entirety of touch panel 7 with a low resolution scan) every few rounds (e.g., every $4^{th}$ round), to check for new touch events.

With dynamic zooming, it is possible to obtain accurate location information on touch events, without relying upon image sensors 30 resolving the location of the touch events. In some arrangements, image sensors 30 could even be replaced by sensors having as little as a single light sensor (e.g., an image sensor binned into a single pixel). In such arrangements, touch panel 7 determines the location of touch events by determining the sections that, when illuminated, create the largest signals in sensors 30 (e.g., detailed information from the sensors 30 "resolving" the touching objects is not needed). The touch resolution of touch panel 7 made be provided from the size of the smallest illuminated section of the dynamic zooming process, rather than the resolution of sensors 30.

Figure 7:
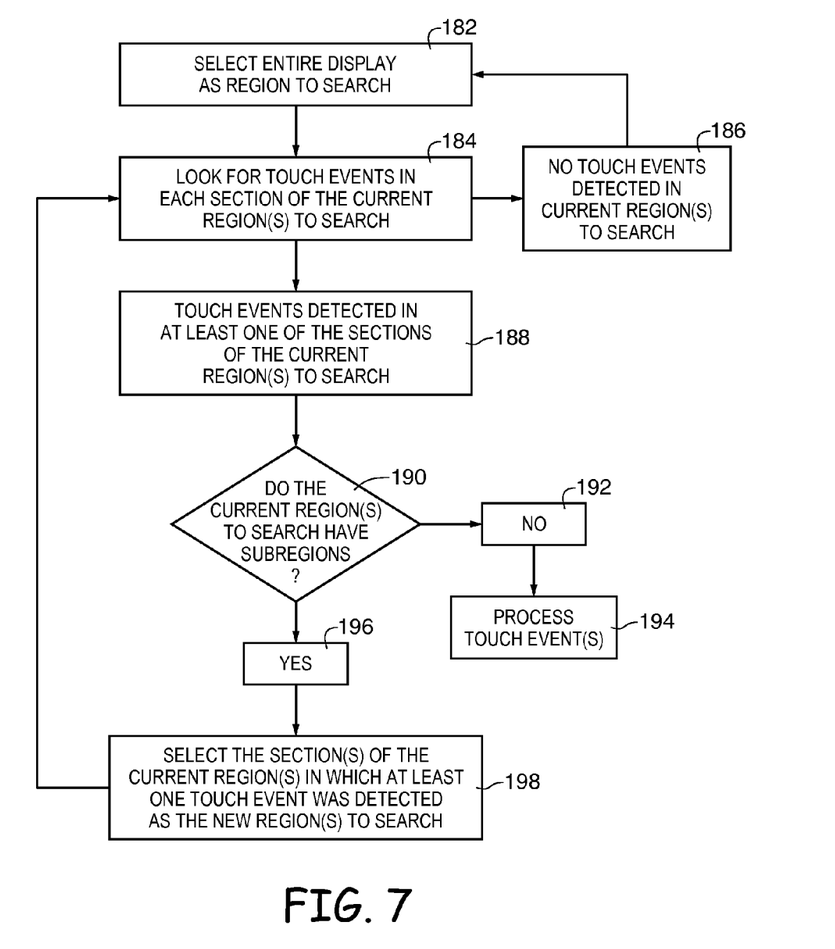
FIG. 7 is a flowchart of illustrative steps involved in detecting touch events in a touch panel that implements dynamic zooming in accordance with embodiments of the present invention.

A flowchart of illustrative steps involve in using dynamic zooming techniques for optical touch detection in a touch panel such as touch panel 7 is shown in FIG. 7.

In step 182, the entirety of touch panel 7 may be selected as a region to search. Step 182 may sometimes be referred to herein as an initialization step.

In step 184, touch panel 7 divide each of the current regions to search (whether there is a single region to search or multiple regions to search) into any desired number of sections and may then search for touch events in each of those sections. As an example, when there are at least two regions to search, touch panel 7 may respectively divide each of the regions to search into any desired number of section. If desired, each region to search may be divided into a three-by-three grid (e.g., nine sections). When step 184 is performed after step 182, touch panel 7 may divide the entirety of touch panel 7 into a suitable number of sections (e.g., nine sections). When step 184 is performed after step 19 (e.g., as part of a zoomed-in search), touch panel 7 may divide each section of the previously searched region(s) in which at least one touch event was detected into a suitable number of sections (such as nine sections). Touch panel 7 may look for touch events such as near-touch events when objects 80 are in close proximity, but not actually touching, cover glass 20 and may look for touch events when objects 80 are touching cover glass 20.

In step 186 and if no touch events are detected in the divided sections of the one or more regions searched in step 184, touch panel 7 may reinitialize dynamic zooming (e.g., zoom back out to once again search the entirety of touch panel 7) in step 182.

In step 188 and if at least one touch event is detected in the in the divided sections of the one or more regions searched in step 184, touch panel 7 may perform the operations of step 190.

In step 190, touch panel 7 may determine if the current region(s) of interest are further divisible into subregions (e.g., whether or not the current region(s) are the last level of dynamic zooming available). If the current region(s) of interest are not further divisible into subregions (e.g., if the current region(s) of interest are the last level of dynamic zooming available) and as illustrated by step 192, then touch panel 7 may perform the operations of step 194. If the current region(s) of interest are further divisible into subregions (e.g., if the current region(s) of interest are not the last level of dynamic zooming available) and as illustrated by step 196, then touch panel 7 may perform the operations of step 198.

In step 194, touch panel 7 may process the one or more touch events detected in the current region(s) of interest. As an example, touch panel 7 may communicate with processing circuitry to inform the processing circuitry of the number, type (e.g., touch or near-touch), and location of each detected touch event.

In step 198, touch panel 7 may dynamically zoom into the one or more sections of the region(s) that were searched in step 184 and in which touch events were found. As an example, touch panel 7 may select the one or more sections of the region(s) searched in step 184 in which touch events were found in step 184 as the new region(s) of interest to search (in a subsequent iteration of step 184).

Figure 8:
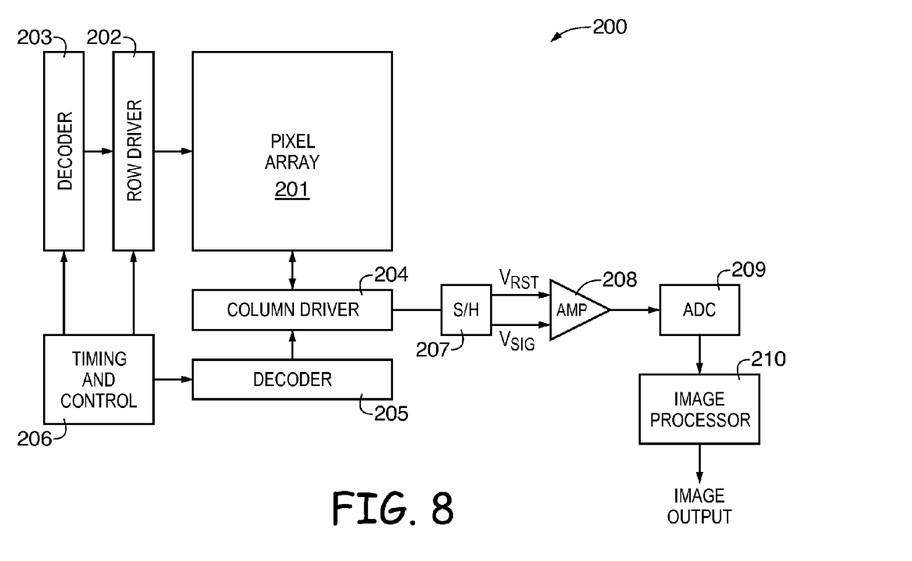
FIG. 8 is a block diagram of an imager that may be used in employing one of the embodiments of FIGS. 2-7 in accordance with embodiments of the present invention.

FIG. 8 illustrates a simplified block diagram of imager 200 (e.g., a CMOS imager used in implementing sensors 30 of cameras 100). Pixel array 201 includes a plurality of pixels containing respective photosensors arranged in a predetermined number of columns and rows. The row lines are selectively activated by row driver 202 in response to row address decoder 203 and the column select lines are selectively activated by column driver 204 in response to column address decoder 205. Thus, a row and column address is provided for each pixel.

CMOS imager 200 is operated by a timing and control circuit 206, which controls decoders 203, 205 for selecting the appropriate row and column lines for pixel readout, and row and column driver circuitry 202, 204, which apply driving voltages to the drive transistors of the selected row and column lines. The pixel signals, which typically include a pixel reset signal Vrst and a pixel image signal Vsig for each pixel are sampled by sample and hold circuitry 207 associated with the column driver 204. A differential signal Vrst−Vsig is produced for each pixel, which is amplified by amplifier 208 and digitized by analog-to-digital converter 209. The analog to digital converter 209 converts the analog pixel signals to digital signals, which are fed to image processor 210 which forms a digital image.

Various embodiments have been described illustrating touch panel with dynamic zooming and low profile bezels.

An electronic device may have a touch panel. The touch panel may detect touch events using one or more cameras. The touch panel may include infrared light emitting elements to illuminate objects that may touch the touch panel with infrared light. The cameras may include infrared filters so that the cameras only receive infrared light.

The touch panel may include a planar exterior surface, such as a cover glass, that extends over an active region of a display and an inactive peripheral region. The cameras may be located underneath the inactive peripheral region. The cameras may include a light turning element to allow the cameras to detect touch events, without being raised above the exterior surface of the active region of the display (e.g., without having a raised profile).

The touch panel may detect touch events using dynamic zooming techniques. As an example, the touch panel may divide the active region into sections and search for touch events in each section. When the touch panel detects, using cameras, one or more objects touching (or nearly touching) one or more of the sections, the touch panel may dynamically zoom into those sections. In subsequent rounds, the touch panel may divide sections in which touch events were detected and search for touch events in each divided portion. The touch panel may continue in any desired number of rounds of dynamic zooming until the location of the touch events is determined with a desired level of accuracy (e.g., an accuracy of less than approximately 1.0 millimeters).

The foregoing is merely illustrative of the principles of this invention and various modifications can be made by those skilled in the art without departing from the scope and spirit of the invention. The foregoing embodiments may be implemented individually or in any combination.

What is claimed is:

1. A method of using an image sensor in a touch panel to detect at least one touch event, wherein the image sensor comprises an array of image sensor pixels arranged in rows and columns, wherein each of the at least one touch events comprises a touch event selected from the group consisting of: an object touching a surface of the touch panel in an active region of the touch panel and the object coming within a threshold distance the surface of the touch panel in the active region of the touch panel, and wherein the image sensor is non-overlapping with the active region of the touch panel, the method comprising:
    dividing the active region of the touch panel into a first plurality of sections;
    receiving light at the image sensor;
    detecting, using the image sensor, the touch event in a given one of the sections of the first plurality of sections, based on the received light;
    dividing the given one of the sections of the first plurality of sections into a second plurality of sections;
    detecting, using the image sensor, the touch event in a given one of the sections of the second plurality of sections, based on the received light;
    dividing the given one of the sections of the second plurality of sections into a third plurality of sections; and
    detecting, using the image sensor, the touch event in a given one of the sections of the third plurality of sections.

2. The method defined in claim 1 wherein the touch panel includes an array of light emitting elements in the active region of the touch panel and wherein detecting, using the image sensor, the touch event in the given one of the sections of the first plurality of sections comprises:
    activating the light emitting elements in the given one of the sections of the first plurality of sections, while the light emitting elements in the other sections of the first plurality of sections are deactivated; and
    receiving light with the image sensor that was emitted by the activated light emitting elements in the given one of the sections of the first plurality of sections and that was scattered off of the object.

3. The method defined in claim 1 wherein the touch panel includes an array of light emitting elements in the active region of the touch panel and wherein detecting, using the image sensor, the touch event in the given one of the sections of the first plurality of sections comprises searching for the touch event in each of the sections of the first plurality of sections.

4. The method defined in claim 3 wherein searching for the touch event in each of the sections of the first plurality of sections comprises:
    for each of the sections of the first plurality of sections, activating the light emitting elements of that section while deactivating the rest of the light emitting elements in the touch panel; and
    for each of the sections of the first plurality of sections, searching, with the image sensor, for light emitted by the activated light emitting elements of that section and scattered off of the object.

5. The method defined in claim 4 wherein detecting, using the image sensor, the touch event in the given one of the sections of the second plurality of sections comprises searching for the touch event in each of the sections of the second plurality of sections.

6. The method defined in claim 5 wherein searching for the touch event in each of the sections of the second plurality of sections comprises:
    for each of the sections of the second plurality of sections, activating the light emitting elements of that section while deactivating the rest of the light emitting elements in the touch panel; and
    for each of the sections of the second plurality of sections, searching, with the image sensor, for light emitted by the activated light emitting elements of that section and scattered off of the object.

7. The method defined in claim 1 wherein the touch panel comprises an array of visible light emitting elements that are together operable to display at least one image in the active region of the touch panel, wherein the touch panel comprises an array of infrared light emitting elements in the active region of the touch panel, and wherein detecting, using the image sensor, the touch event comprises using the image sensor to detect infrared light emitted by at least some of the infrared light emitting elements.

8. The method defined in claim 1 further comprising:
    dividing the given one of the sections of the second plurality of sections into a third plurality of sections; and
    detecting, using the image sensor, the touch event in a given one of the sections of the third plurality of sections.

9. A touch panel comprising:
    a display module comprising a plurality of pixels arranged in an array, wherein the plurality of pixels comprise infrared light emitting pixels that selectively emit infrared light, wherein the infrared light emitting pixels comprise a plurality of infrared light emitting pixel groups, wherein selected groups of the plurality of infrared light emitting pixel groups are activated while remaining groups of the plurality of infrared light emitting pixel groups are deactivated at a first time, wherein a first set of additional selected groups of the plurality of infrared light emitting pixel groups that are a subset of the selected groups are activated while remaining groups of the plurality of infrared light emitting pixel groups are deactivated at a second time that is after the first time, and wherein a second set of additional selected groups of the plurality of infrared light emitting pixel groups that are a subset of the first set of additional selected groups of the infrared light emitting pixel groups are activated while remaining groups of the plurality of infrared light emitting pixel groups are deactivated at a third time that is after the second time;

at least one camera operable to detect touch events, wherein the at least one camera has an array of image sensor pixels arranged in rows and columns; and a planar cover member over both the display module and the at least one camera.

10. The touch panel defined in claim 9 wherein the at least one camera is located adjacent to the display module and wherein the at least one camera comprises a light turning element.

11. The touch panel defined in claim 10 wherein the light turning element comprises a light turning film having a lenticular prism array.

12. The touch panel defined in claim 11 further comprising:

wherein at least a portion of the planar cover member comprises light blocking material, wherein the light blocking material obscures inactive peripheral regions of the touch panel and at least a portion of the camera from the view of users of the touch panel.

13. The touch panel defined in claim 9 wherein the display module comprises:

visible light emitting elements operable to display images for users of the touch panel; and infrared light emitting elements operable to selectively emit infrared light, wherein the camera comprise a camera operable to receive infrared light emitted by the infrared light emitting elements and scattered off one or more objects touching the touch panel.

14. A system, comprising:
a central processing unit;
memory;
input-output circuitry; and
a touch panel, wherein the touch panel comprises:
    a display module, comprising:
        visible light emitting pixels that display images for users of the touch panel; and
        infrared light emitting pixels that selectively emit infrared light, wherein at least a portion of the infrared light emitting pixels are interposed between the visible light emitting pixels, wherein the visible and infrared light emitting elements of the display module are located in an active region of the display module, wherein the active region of the display module is divided into a first plurality of sections, wherein each of the sections of the first plurality of sections is divided into a second plurality of sections, wherein each of the sections of the second plurality of sections is divided into a third plurality of sections; and
    circuitry that, at a first time, activates the infrared pixels in a given one of the sections of the first plurality of sections while deactivating the rest of the light emitting elements in the touch panel, at a second time, activates the infrared pixels in a given one of the sections of the second plurality of sections while deactivating the rest of the light emitting elements in the touch panel, and at a third time, activates the infrared pixels in a given one of the sections of the third plurality of sections while deactivating the rest of the light emitting elements in the touch panel; and
    a plurality of CMOS cameras together operable to detect when one or more objects are touching the touch panel, wherein each camera is operable to receive infrared light emitted by the infrared light emitting elements and scattered off the one or more objects.

15. The system defined in claim 14 wherein the touch panel further comprises a planar cover member over both the display module and at least one CMOS camera of the plurality of CMOS cameras.

16. The system defined in claim 15 wherein the planar cover member comprises a cover glass member.

17. The system defined in claim 16 wherein the cover glass member comprises a flat surface that extends over both the display module and the at least one CMOS camera.

* * * * *